(12) United States Patent
Nakajima

(10) Patent No.: US 8,185,673 B2
(45) Date of Patent: May 22, 2012

(54) INFORMATION PROCESSING APPARATUS, AND METHOD FOR CONTROLLING THE SAME

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/818,933

(22) Filed: Jun. 18, 2010

(65) Prior Publication Data

US 2010/0332692 A1    Dec. 30, 2010

(30) Foreign Application Priority Data

Jun. 24, 2009   (JP) .................................. 2009-149802

(51) Int. Cl.
*G06F 13/14* (2006.01)
(52) U.S. Cl. .......................................... 710/36; 710/62
(58) Field of Classification Search .................... None
See application file for complete search history.

(56) References Cited

U.S. PATENT DOCUMENTS

| 6,012,103 A | * | 1/2000 | Sartore et al. ..................... 710/8 |
| 2003/0088318 A1 | | 5/2003 | Edogawa et al. |
| 2008/0144120 A1 | | 6/2008 | Katahira |
| 2008/0276012 A1 | * | 11/2008 | Mesa et al. ..................... 710/13 |

FOREIGN PATENT DOCUMENTS

| EP | 1906642 A2 | | 4/2008 |
| JP | 2003008683 A | * | 1/2003 |
| JP | 2003-131956 A | | 5/2003 |
| JP | 2008-027379 A | | 2/2008 |

* cited by examiner

*Primary Examiner* — Cheng-Yuan Tseng
(74) *Attorney, Agent, or Firm* — Canon U.S.A., Inc. IP Division

(57) ABSTRACT

An information processing apparatus includes an interface, a detector, a manager, a usage interruption unit, and a determination unit. The interface is for connecting to a peripheral device to form a connected peripheral device. The detector is for detecting a connection and a disconnection between the interface and a peripheral device. The manager is for managing device specifying information that specifies the connected peripheral device. The usage interruption unit is for setting a connected peripheral device to a usage interruption state. The determination unit is for determining whether the usage interruption unit set the connected peripheral device to the usage interruption state. The manager may manage a reconnected peripheral device using device information that existed before the connected peripheral device was disconnected from the interface.

9 Claims, 9 Drawing Sheets

FIG.4

| 401 | 402 | 403 | 404 | 405 |
|---|---|---|---|---|
| DEVICE FILE NAME | VendorID | ProductID | SERIAL NUMBER | STATE |
| /dev/sdb1 | 0x1111 | 0x2222 | 123456 | CONNECTED |
| /dev/sdc1 | 0x1111 | 0x2222 | 123456 | CONNECTED |
| /dev/sdd1 | 0x1111 | 0x2222 | 123456 | CONNECTED |

| DEVICE FILE NAME | VendorID | ProductID | SERIAL NUMBER | IDENTIFICATION INFORMATION | STATE | PREVIOUS DEVICE FILE NAME |
|---|---|---|---|---|---|---|
| /dev/sdb1 | 0x1111 | 0x2222 | 123456 | A | MOUNTED | — |
| /dev/sdc1 | 0x1111 | 0x2222 | 123456 |   | MOUNTED | — |
| /dev/sdd1 | 0x1111 | 0x2222 | 123456 | B |   | — |

600B

| DEVICE FILE NAME | VendorID | ProductID | SERIAL NUMBER | IDENTIFICATION INFORMATION | STATE | PREVIOUS DEVICE FILE NAME |
|---|---|---|---|---|---|---|
| — | 0x1111 | 0x2222 | 123456 | A | UNMOUNTED | /dev/sdb1 |
| — | 0x1111 | 0x2222 | 123456 |   | UNMOUNTED | /dev/sdc1 |
| — | 0x1111 | 0x2222 | 123456 | B |   | /dev/sdd1 |

600C

| DEVICE FILE NAME | VendorID | ProductID | SERIAL NUMBER | IDENTIFICATION INFORMATION | STATE | PREVIOUS DEVICE FILE NAME |
|---|---|---|---|---|---|---|
| /dev/sdc1 | 0x1111 | 0x2222 | 123456 | A | MOUNTED | /dev/sdb1 |
| /dev/sdf1 | 0x1111 | 0x2222 | 123456 |   | MOUNTED | /dev/sdc1 |
| /dev/sdg1 | 0x1111 | 0x2222 | 123456 | B |   | /dev/sdd1 |

| DEVICE FILE NAME | VendorID | ProductID | SERIAL NUMBER | IDENTIFICATION INFORMATION | TEMPORARY-DISCONNECTION FLAG |
|---|---|---|---|---|---|
| /dev/sdb1 | 0x1111 | 0x2222 | 123456 | A | OFF |
| /dev/sdc1 | 0x1111 | 0x2222 | 123456 | B | OFF |

700B

| DEVICE FILE NAME | VendorID | ProductID | SERIAL NUMBER | IDENTIFICATION INFORMATION | TEMPORARY-DISCONNECTION FLAG |
|---|---|---|---|---|---|
| /dev/sdb1 | 0x1111 | 0x2222 | 123456 | A | ON |
| /dev/sdc1 | 0x1111 | 0x2222 | 123456 | B | ON |

700C

| DEVICE FILE NAME | VendorID | ProductID | SERIAL NUMBER | IDENTIFICATION INFORMATION | TEMPORARY-DISCONNECTION FLAG |
|---|---|---|---|---|---|
| /dev/sdc1 | 0x1111 | 0x2222 | 123456 | A | OFF |
| /dev/sdf1 | 0x1111 | 0x2222 | 123456 | B | OFF |

701  702  703  704  705  706

INFORMATION PROCESSING APPARATUS, AND METHOD FOR CONTROLLING THE SAME

BACKGROUND OF THE INVENTION

1. Field of the Invention

The present invention relates to an information processing apparatus that is connectable to an external device (peripheral device) via an interface.

2. Related Background Art

Conventionally, a Universal Serial Bus (USB) interface has been used to establish a connection between a host apparatus and an external device. When a host apparatus is connected to an external device, the host apparatus detects the connection of the external device to a USB interface, through a device driver for example, and performs a process to make the external device accessible. When the host apparatus receives an instruction to disconnect the external device from an operator, the host apparatus performs processing for shifting a state that the external device can be disconnected therefrom. If the external device is physically disconnected from the host apparatus, the host apparatus detects the disconnection of the external device from the USB interface using a device driver for example, and performs processing for shifting a state that the external device is disconnected therefrom.

In such a system, sometimes an unintended event, for example static electricity is applied to the external device, may accidentally happen and make the electrical connection between the host apparatus and the external device temporarily disconnected. In such a case, a turn-off and restart of the host computer is necessary and a recovery may take long time. To address this problem, Japanese Patent Application Laid-Open No. 2003-131956 discusses a technique in which a circuit of a general interface for transmission and reception of data between a host apparatus and an external device is restarted. Japanese Patent Application Laid-Open No. 2008-27379 discusses a technique for restarting a device control module in a host apparatus.

In the conventional techniques, when an information processing apparatus such as a host apparatus is electrically disconnected temporarily from an external device due to static electricity for example, a device control module is restarted to reset the external device to a connection state. Such approach to recover the connection, however, does not store the previous connection state of the external device before the disconnection. Thus, even when the device control module is restarted to connect the host apparatus to the external device again, the restored connection state is not always the same state before the disconnection. In this case, when the host apparatus attempts to access the external device based on the connection state before disconnection, the host apparatus may not be able to access the external device due to a mismatch between the connection states before and after the disconnection.

SUMMARY OF THE INVENTION

The present invention relates to an information processing apparatus, when an external device connected to the information processing apparatus via an interface is temporarily disconnected, and then reconnected, that can access the external device based on a connection state before the disconnection.

According to an aspect of the present invention, an information processing apparatus includes a peripheral device, an interface unit arranged to connect the information processing apparatus to the peripheral device, a detection unit configured to detect a connection and a disconnection between the interface unit and the peripheral device, a management unit configured to manage device information that specifies the peripheral device the connection of which to the interface unit is detected by the detection unit, a disconnection unit configured to set the peripheral device connected to the interface unit to a disconnected state, and a determination unit configured to determine whether the peripheral device has been set to the disconnected state by the disconnection unit prior to the detection unit detecting an unexpected disconnection of the interface unit from the peripheral device, wherein, when the peripheral device which is determined as not having been set to the disconnected state prior to the unexpected disconnection by the determination unit is reconnected to the interface unit following said unexpected disconnection, the management unit is arranged to manage the peripheral device using previous device information obtained before the peripheral device is disconnected from the interface unit.

According to an exemplary embodiment of the present invention, even if an accidental disconnection, which is not intended by an operator, of a device from an information processing apparatus happens, the operator can use the device without being conscious of the disconnection and reconnection of the device. Accordingly, operability of the information processing apparatus can be improved.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of connection state information.

FIG. 6 illustrates examples of detected information.

FIG. 7 illustrates examples of management information.

DESCRIPTION OF THE EMBODIMENTS

Various exemplary embodiments, features, and aspects of the invention will be described in detail below with reference to the drawings.

Figure 1:
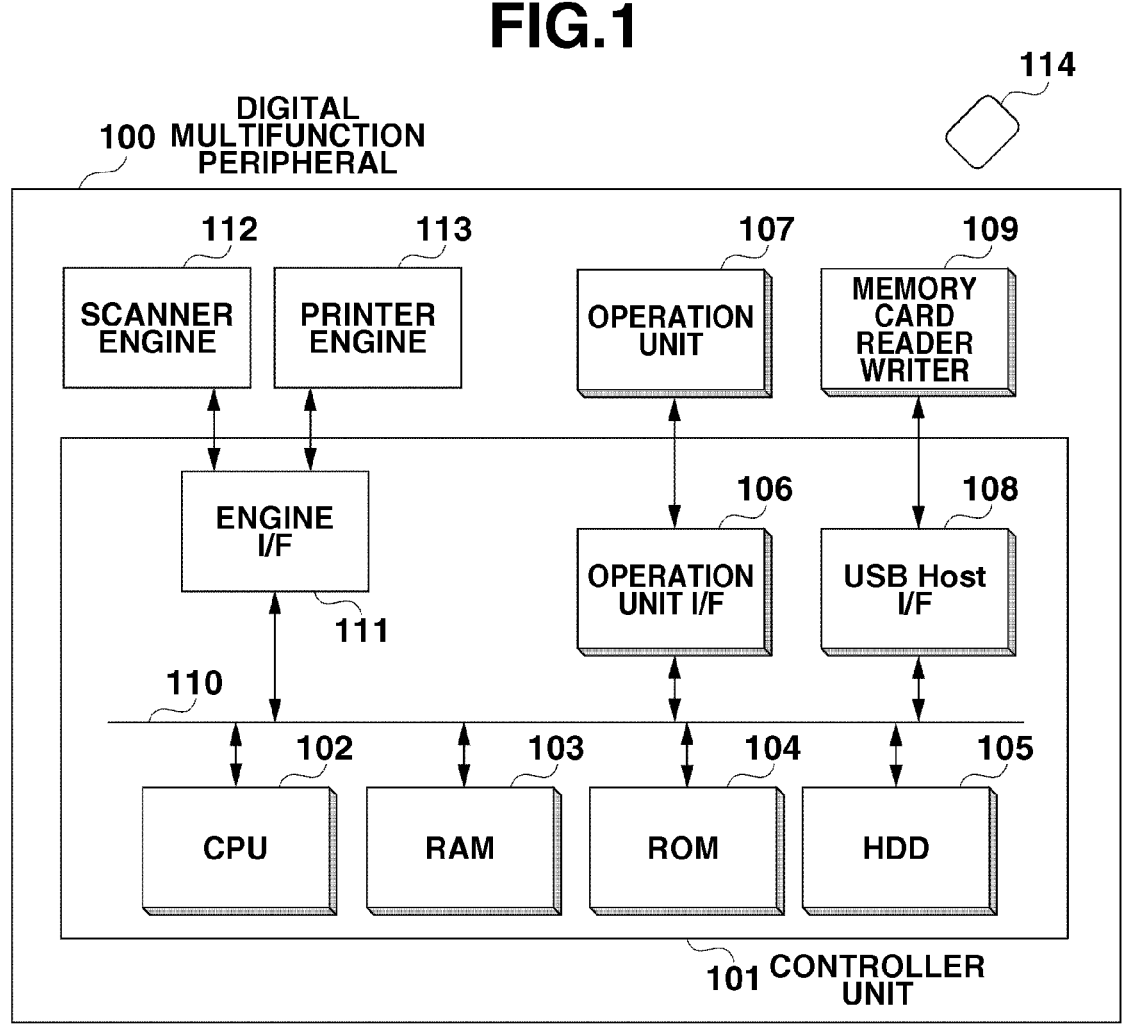
FIG. 1 is a block diagram illustrating an example configuration of a digital multifunction peripheral.

FIG. 1 is a block diagram illustrating an example configuration of a digital multifunction peripheral that is an example of an information processing apparatus. A digital multifunction peripheral 100 includes a controller unit 101 in which a central processing unit (CPU) 102 controls the entire system of the digital multifunction peripheral 100. A random access memory (RAM) 103 is a system work memory for operations of the CPU 102. A read only memory (ROM) 104 is a boot ROM storing system boot programs. A hard disk drive (HDD) 105 stores system software and the like.

An operation unit interface (I/F) 106 is an interface unit to an operation unit 107, and outputs information to the operation unit 107 for display thereon. The operation unit I/F 106 transmits information input via the operation unit 107 by an operator to the CPU 102. The operation unit 107 includes a display unit including a liquid crystal display and an operation unit including a touch panel sheet, hard keys and the like.

A USB host interface (I/F) 108 serves as an interface to a USB device such as a memory card reader writer 109. In the present exemplary embodiment, a USB device such as the memory card reader writer 109 is used for description as an example of an external device or a peripheral device, but the external device may include a USB memory and other devices. The USB host I/F 108 outputs information input from the operation unit 107 or information stored in the HDD 105 to the memory card reader writer 109. The USB host I/F 108 also transmits information obtained from the memory card reader writer 109 to the CPU 102. The units 102 to 108 are connected to a system bus 110. The USB host I/F 108 is connected to the memory card reader writer 109 using a USB cable. The USB host I/F 108 may be provided with a plurality of USB connectors. In this case, among the plurality of USB connectors, a specific USB connector is managed to be connected to the memory card reader writer 109.

The system bus 110 is also connected to an engine interface 111. The engine interface 111 is further connected to a scanner engine 112 and a printer engine 113.

In the present exemplary embodiment, the memory card reader writer 109 is an example of a USB device. Other examples of the USB devices include a USB memory, a USB hard disk (HDD), a digital camera, an audio player, a cell phone, a compact disk (CD)/digital versatile disk (DVD) drive, and an integrated circuit (IC) card reader. The memory card reader writer 109 of the present exemplary embodiment is provided with a plurality of slots that allow insertions and connections of different types of memory cards 114 which are compact storage media. The memory card reader writer 109 also enables connections of a plurality of the memory cards 114 simultaneously. Examples of the memory cards 114 include a secure digital (SD) card, a Smartmedia, a CompactFlash (registered trademark), a memory stick, a microdrive, and the like, and the memory card reader writer 109 reads and writes data from and in these devices.

Alternatively, the memory card reader writer 109 may be provided with a USB hub, so that another USB device can be connected to the memory card reader writer 109.

Figure 2:
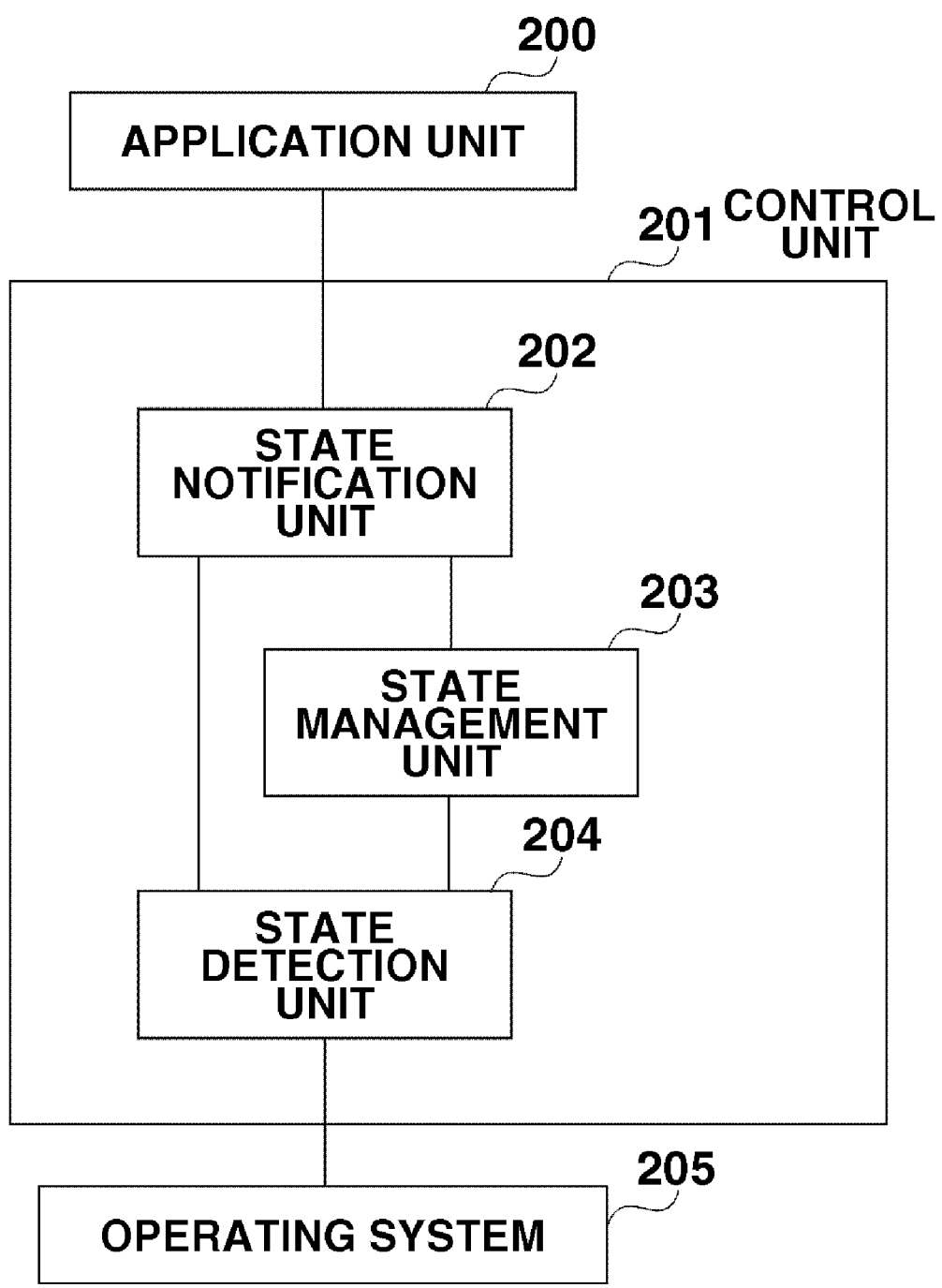
FIG. 2 is a block diagram illustrating example of system software configuration of a digital multifunction peripheral.

FIG. 2 is a block diagram illustrating a configuration of system software of the digital multifunction peripheral according to the present exemplary embodiment. Each of components 200 to 205 in FIG. 2 is a program module that is stored in the ROM 104 or the HDD 105 in FIG. 1 to be executed by the CPU 102.

An application unit 200 provides a user interface to an operator for reference to the memory card 114, and reading and writing of data from and to the memory card 114 via the operation unit 107. The application unit 200 receives operation input information from the operator, and also gives an instruction to the control unit 201 to obtain a state of the memory card 114. Alternatively, the application unit 200 receives information that indicates a connection (mount) state of the memory card 114 from the control unit 201. In this case, the control unit 201 accepts the instruction to obtain the state of the memory card 114 from the application unit 200, and notifies the application unit 200 of the connection state of the memory card 114 connected to the memory card reader writer 109.

The control unit 201 includes a state notification unit 202, a state management unit 203, and a state detection unit 204. The state notification unit 202 receives the information that indicates the connection state of the memory card 114 connected to the memory card reader writer 109 from the state management unit 203 and the state detection unit 204, and notifies the application unit 200 of the received information. The state management unit 203 manages the connection state of the memory card 114 connected to the memory card reader writer 109, the states being detected by the state detection unit 204. The state detection unit 204 inquires about a current connection state of the memory card reader writer 109 to the operating system 205, and obtains and manages information indicating the connection state as a detection result.

The state detection unit 204 detects a connection and/or a disconnection of the memory card reader writer 109 based on the information obtained from the operating system 205. Then, the state detection unit 204 detects whether the memory card 114 is connected to the memory card reader writer 109, and notifies the state notification unit 202 and the state management unit 203 of a detection result.

When the memory card 114 is connected to the memory card reader writer 109 by the system software processing, the state detection unit 204 detects the connection of the memory card 114, and the state management unit 203 stores the connection information of the memory card 114 in the RAM 103. The connection information is notified to the application unit 200 via the state notification unit 202. Accordingly, the information of the memory card 114 can be output (displayed) onto the operation unit 107 which makes the memory card 114 accessible. When the memory card 114 is brought to a usage interruption (unmounted) state, the state detection unit 204 detects the disconnection of the memory card 114, and the state management unit 203 deletes the connection information of the memory card 114 from the RAM 103. Then, the disconnection information is notified to the application unit 200 via the state notification unit 202. Accordingly, the disconnection information of the memory card 114 is output (displayed) onto the operation unit 107, and the displayed information of the memory card 114 is deleted. Thus, no more operation to access the memory card 114, which is already removed, can be performed by the operator.

Upon a reception of an instruction to disconnect the memory card 114 from the operator, the state detection unit 204 performs processing for unmounting the memory card 114. In response to the processing result, the state management unit 203 deletes the connection information of the memory card 114 from the RAM 103. Unmount information is notified to the application unit 200 via the state notification unit 202. Consequently, information indicating that the memory card 114 is processed to be disconnected is output to the operation unit 107, and simultaneously the information of the memory card 114 that has been displayed on operation unit 107 is deleted, to make the memory card 114 inaccessible by the operator.

The present exemplary embodiment is described on assumption that the memory card reader writer 109 is connected to the digital multifunction peripheral 100 in a housing. In other words, in the present exemplary embodiment, the digital multifunction peripheral 100 is not physically disconnected from the memory card reader writer 109 in normal use. Sometimes, however, for example when a user touches the memory card reader writer 109, static electricity may be generated which results in noise in electrical signals between the USB host I/F 108 and the memory card reader writer 109. The noise brings the electrical connection between the USB host I/F 108 and the memory card reader writer 109 into an abnormal state temporarily, and the operating system 205 cannot recognize the memory card reader writer 109. This phenomenon is equivalent to that the physical connection between the USB host I/F 108 and the memory card reader writer 109 is momentarily disconnected and then reconnected. Thus, the state detection unit 204 detects a temporary disconnection of the memory card reader writer 109. The control unit 201 also detects a usage interruption (unmount) of the memory card connected to the memory card reader writer 109.

A method for recovering a previous connection state before disconnection when a temporary unmount of the memory card reader writer, which does not occur under normal circumstances, accidentally happens will be described. By the method, the memory card reader writer is made accessible using the previous connection information before disconnection on the operation unit 107, even when the reconnection of the memory card reader writer is provided as new connection information to the operating system 205. The detail will be described below.

Figure 3:
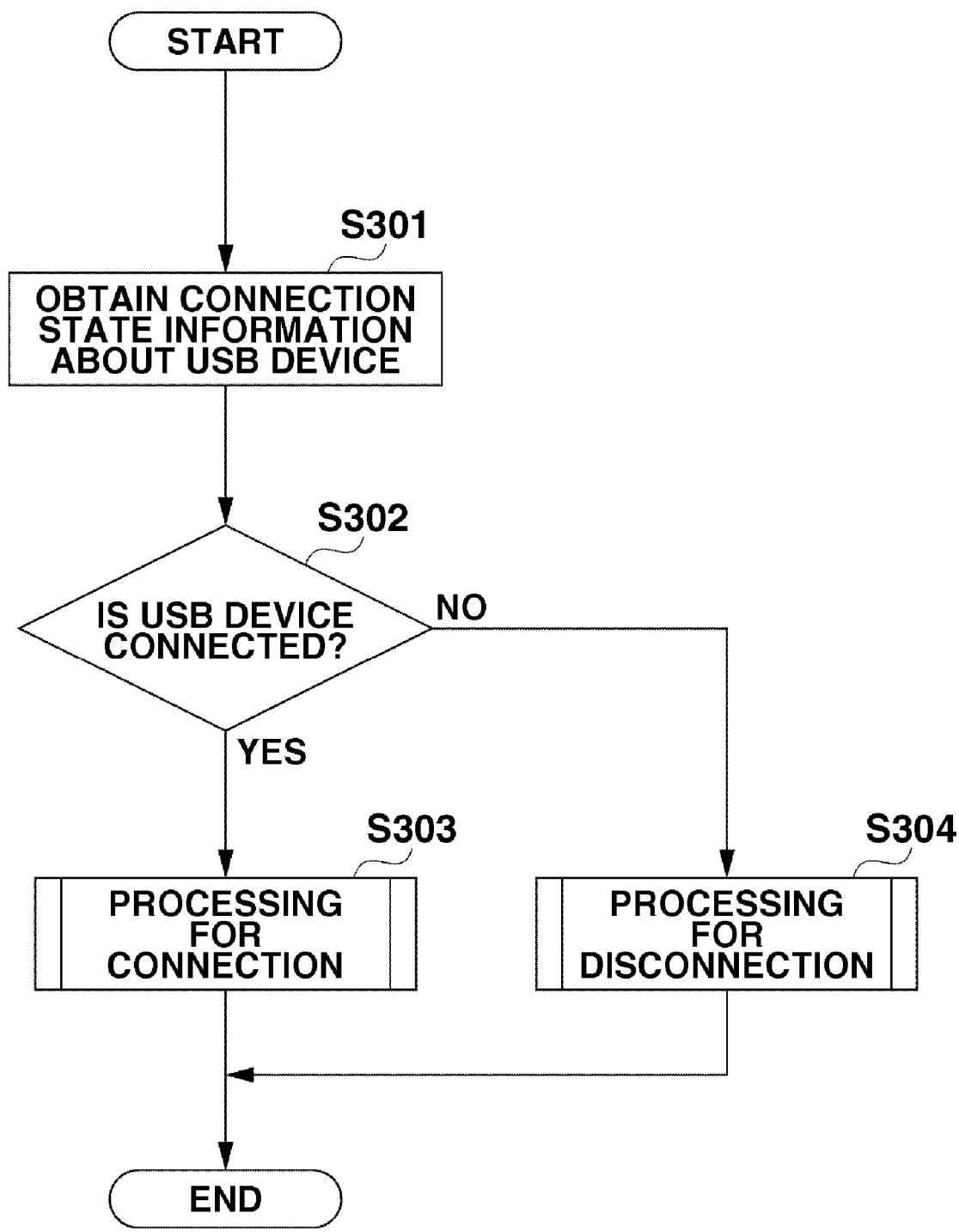
FIG. 3 is a flowchart illustrating processing for detecting a USB device in a digital multifunction peripheral.

FIG. 3 is a flowchart illustrating processing for detecting a USB device in the digital multifunction peripheral 100. The processing illustrated in the flowchart is executed by the CPU 102.

First, a USB device such as the memory card reader writer 109 is connected to the USB host I/F 108. Upon recognition of the physical connection of the USB device, the operating system 205 reads a necessary driver from the HDD 105, and obtains device information from the USB device to store in the RAM 103 as connection state information. The operating system 205 assigns an access point to the USB device as a device file. The device file is one example of device specifying information that is generated by the operating system 205 to specify the USB device.

FIG. 4 illustrates an example of connection state information. A device filename 401 includes names of the above described device files. When the USB device is the memory card reader writer 109 that has a plurality of slots, a device file is assigned to each of the slots. Accordingly, the operating system 205 can specify the slot based on the device file name, and then specify a memory card inserted in the slot. A vendor identification (VendorID) 402 includes a vendor ID for each USB device, and a ProductID 403 includes a product ID for each USB device. A serial number 404 can be used for identifying a specific unit of the USB device. A state 405 indicates a connection state of the device, and includes information such as "connected" and "disconnected" (or identifiers for each of the states). FIG. 4 illustrates the case where a memory card reader writer having three slots is connected, and each of the slots is assigned with a device file. In the case where a memory card reader writer having a different number of slots is connected to the USB host I/F 108, the number of device files is assigned to the slots respectively.

The processing illustrated in flowchart in FIG. 3 is started under the conditions as described above. In step S301, the state detection unit 204 obtains the connection state information of the USB device from the operating system 205. In step S302, the control unit 201 analyzes the obtained connection state information of the USB device and determines whether the USB device is connected. If the control unit 201 determines that the USB device is connected (YES in step S302), the processing proceeds to step S303. In step S303, connection processing of the USB device is performed (which will be described below) and then the processing ends. On the other hand, if the control unit 201 determines that the USB device is not connected (NO in step S302), the processing proceeds to step S304. In step S304, disconnection processing of the USB device is performed (which will be described below) and the processing ends.

Figure 5:
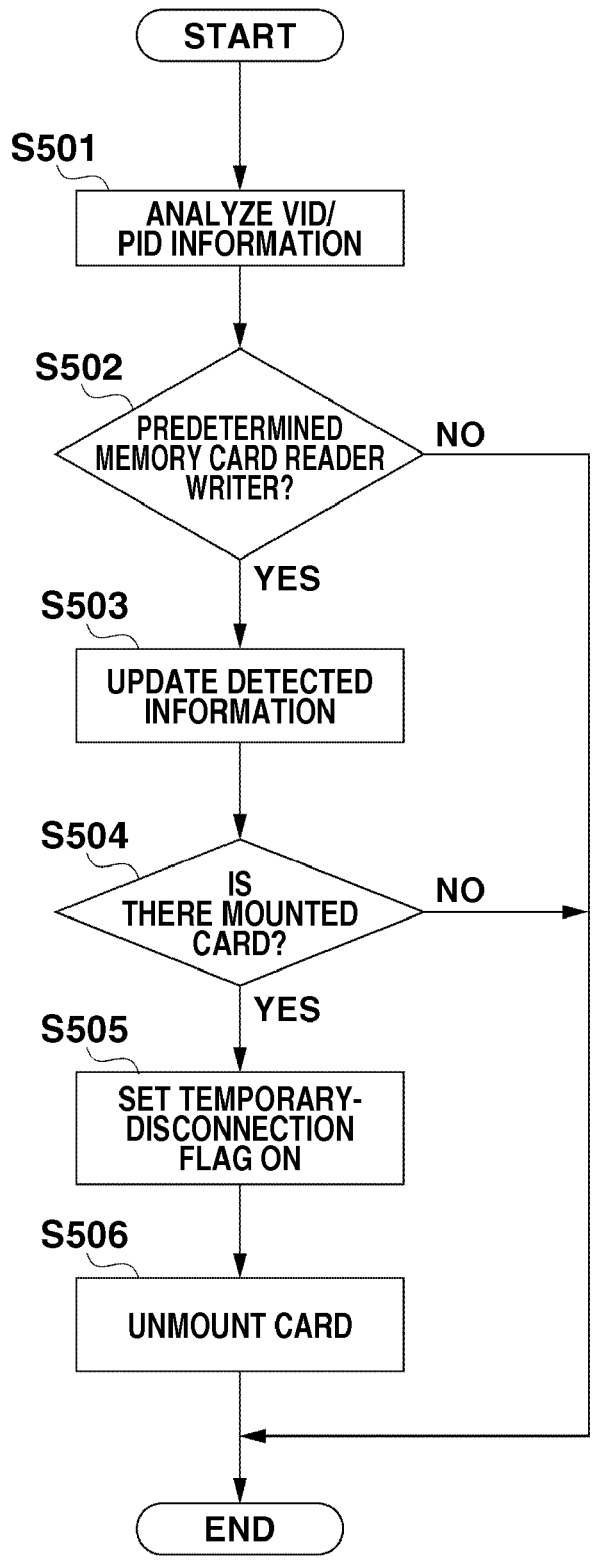
FIG. 5 is a flowchart illustrating processing for disconnecting a USB device in a digital multifunction peripheral.

FIG. 5 is a flowchart illustrating processing for disconnecting a USB device in the digital multifunction peripheral 100. The flowchart illustrates details of the processing in step S304 in the flowchart in FIG. 3.

It is assumed that the digital multifunction peripheral 100 according to the present exemplary embodiment can use only a specific memory card reader writer. Accordingly, a VendorID and a ProductID for the specific memory card reader writer are stored in a specific area (specific device information storage area) in the HDD 105 as specific external device information (specific peripheral device information). There may be a plurality of VendorIDs and ProductIDs stored in the HDD 105 as specific external device information.

In step S501, the state detection unit 204 compares the VendorID and the ProductID that are managed as the specific external device information with a VendorID and a ProductID in the connection state information obtained from the RAM 103 for analysis. In step S502, the state detection unit 204 determines whether the disconnected USB device is the memory card reader writer specified by the specific external device information, and if the USB device is not the specific memory card reader writer 109 (NO in step S502), the processing ends. Whereas if the USB device is the specific memory card reader writer 109 (YES in step S502), the processing proceeds to step S503. In step S503, the state detection unit 204 updates the detected information stored in the RAM 103 which is managed by the state detection unit 204, based on the information of the disconnected memory card reader writer 109. The detected information will be described below.

FIG. 6 illustrates examples of the detected information in the state detection unit 204. The detected information includes several items. A device file name 601 is information assigned by the operating system 205 to specify a slot of the memory card reader writer 109 and is equivalent to the device file name 401 in the connection state information in FIG. 4. A VendorID 602 includes an ID of a vender of the memory card mounted (i.e., in an available state) to a slot. A ProductID 603 includes a product ID of the memory card mounted to a slot. A serial number 604 can be used for specifying an individual memory card mounted to a slot. Identification information 605 is a unique ID for identifying a memory card and is issued by the state detection unit 204 when the memory card is successfully mounted. In the identification information 605 of the present exemplary embodiment, a drive letter represented by one alphabet is used as an example, but any information that identifies a memory card may be used. A state 606 indicates a connection state of a memory card which is represented by either MOUNTED (the memory card is inserted and connected to the slot) or UNMOUNTED (the memory card is removed from the slot and disconnected). A previous device file name 607 includes the last device file name before disconnection which is stored when the memory card reader writer 109 is disconnected.

The detected information 600A illustrates information example when the memory card reader writer 109 is connected. The detected information 600B illustrates information example when the memory card reader writer 109 is disconnected. The detected information 600B includes, in the previous device file name 607, the device file name of each slot before the memory card reader writer 109 is disconnected.

The detected information 600C illustrates information example when the disconnected memory card reader writer 109 is reconnected. The detected information 600C includes, in the previous device file name 607, the device file name of each slot before the memory card reader writer 109 is disconnected. At this point, in the device file name 601 in the detected information 600C, a device file name is described which is newly assigned by the operating system 205 to each slot for the reconnection. It will be noted that the device file name 601 and the previous device file name 607 for the same slot are different from each other.

In step S503 of the flowchart in FIG. 5 illustrating processing for disconnection of the USB device, the detected information is updated from the detected information 600A to the detected information 600B.

Then, in step S504, it is determines whether there is a mounted memory card in the memory card reader writer 109. More specifically, the determination is performed by searching for management information of the memory card from the management information managed by the state management unit 203. The management information will be described below.

FIG. 7 illustrates examples of the management information managed by the state management unit 203. The management information of the memory card connected and mounted to the memory card reader writer is managed in the form of a table, and the information about each memory card is stored in the RAM 103 as one record. The management information includes a device file name 701, VendorID 702, ProductID 703, serial number 704, identification information 705, and temporary-disconnection flag 706. The device file name 701, the VendorID 702, the ProductID 703, the serial number 704, and the identification information 705, include the same information as the information in the device file name 601, the VendorID 602, the ProductID 603, the serial number 604, and the identification information 605 in FIG. 6, respectively. The temporary-disconnection flag 706 is a flag for indicating a state of usage interruption (i.e., unmount) of the memory card due to disconnection between the USB host I/F 108 and the memory card reader writer 109. "ON" in the temporary-disconnection flag 706 corresponds to unmount of the memory card.

The management information 700A illustrates information when two memory cards are mounted. The management information 700B illustrates information when the USB host I/F 108 is disconnected from the memory card reader writer 109. The management information 700C illustrates information when the USB host I/F 108 is reconnected to the memory card reader writer 109. Processing for updating the management information will be described below.

In step S504, if there is no record in the management information, or no memory card is connected (NO in step S504), the processing ends. On the other hand, if there is a record in the management information, or at least one memory card is connected (YES in step S504), the processing proceeds to step S505.

In step S505, a temporary-disconnection state is recorded in the corresponding record of the memory card in the management information managed by the state management unit 203. In other words, the records in the temporary-disconnection flag 706 in the management information 700A are changed to "ON" for updating the information as illustrated in the management information 700B. In step S506, processing for unmounting the memory card in the slot is performed, and the processing ends. At this point of time, no notification of the disconnection is made from the state notification unit 202 to the application unit 200. It is because the disconnection between the USB host I/F 108 and the memory card reader writer 109, which does not occur under normal circumstances, can be considered to be caused by static electricity which is expected to be recovered in a short time. Therefore, since the disconnection of the memory card due to a reason the operator does not know is not displayed on the operation unit 107 according to the above processing, unnecessary confusion of the operator can be avoided.

Figure 8:
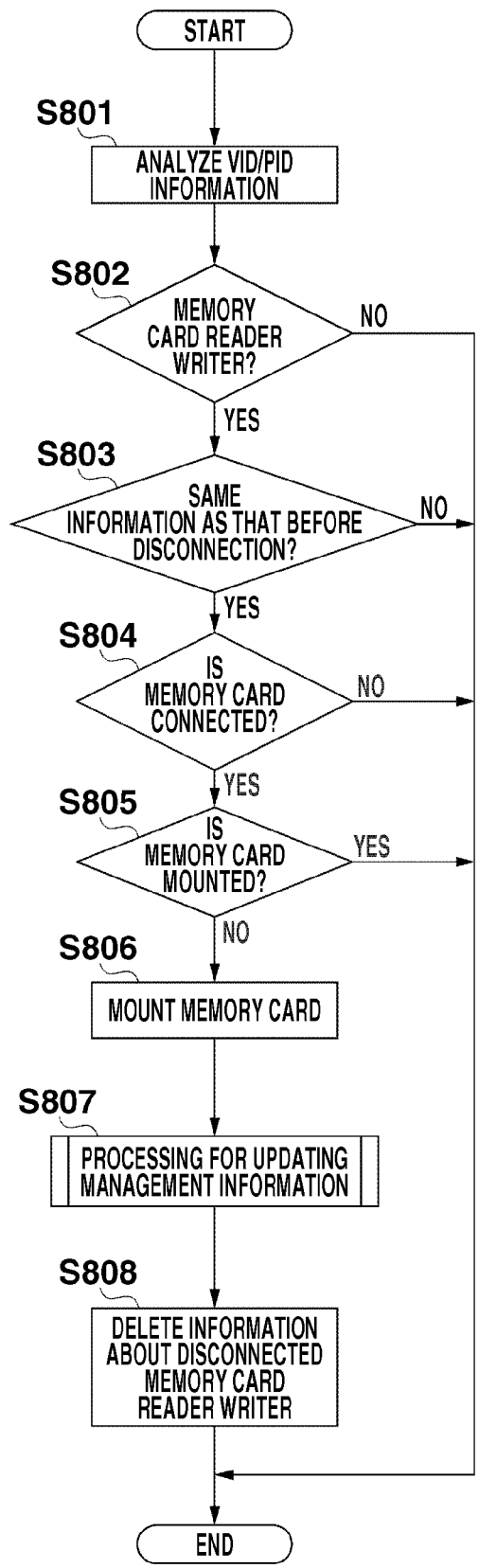
FIG. 8 is a flowchart illustrating processing for connecting a USB device in a digital multifunction peripheral.

FIG. 8 is a flowchart illustrating processing for connecting the USB device in the control unit 201. The flowchart illustrates details of the processing in step S303 in the flowchart in FIG. 3.

Upon recognition of the physical connection of the USB device, the operating system 205 obtains device information from the USB device to store the information in the RAM 103 as connection state information. The operating system 205 assigns an access point to the USB device as a device file.

In step S801, the state detection unit 204 analyzes information about the VendorID and the ProductID based on the connection state information obtained from the RAM 103. In step S802, the state detection unit 204 determines whether the connected USB device is the specific memory card reader writer 109 based on the analysis result, and if the device is not the specific memory card reader writer 109 (NO in step S802), the processing ends. If the state detection unit 204 determines that the memory card is the specific memory card reader writer 109 (YES in step S802), the processing proceeds to step S803.

In step S803, it is determined whether the information is the same as that of the memory card reader writer 109 which is stored at the time of disconnection. More specifically, it is determined whether the VendorID and the ProductID in the updated detected information 600B in step S503 match the VendorID and the ProductID of the connected memory card reader writer 109. If the information is not the same as that of the memory card reader writer 109 which is stored at the time of disconnection (NO in step S803), the processing ends. If the information is the same as that of the memory card reader writer 109 which is stored at the time of disconnection (YES in step S803), the processing proceeds to step S804.

In step S804, it is determined whether the memory card is connected to the connected memory card reader writer 109. The determination can be made by accessing the device file using the device file name managed in the detected information 600B. If no memory card is connected (NO in step S804), the processing ends. If the memory card is connected (YES in step S804), then in step S805, it is determined whether the memory card is already mounted.

If the memory card is mounted (YES in step S805), the processing ends. If the memory card is not mounted (NO in step S805), then in step S806, processing for mounting the memory card is performed. In step S807, processing for updating the management information is performed. The step S807 will be described in detail below.

Then in step S808, the previous device file name is deleted from the detected information, and the processing ends. At this point of time, no notification of the connection is made from the state notification unit 202 to the application unit 200

In this way, when a temporary disconnection and reconnection happened due to an unknown reason to the operator, the reconnection can be achieved without making the operator aware of this, and an access can be made to the same operation memory card as that before the disconnection.

Figure 9:
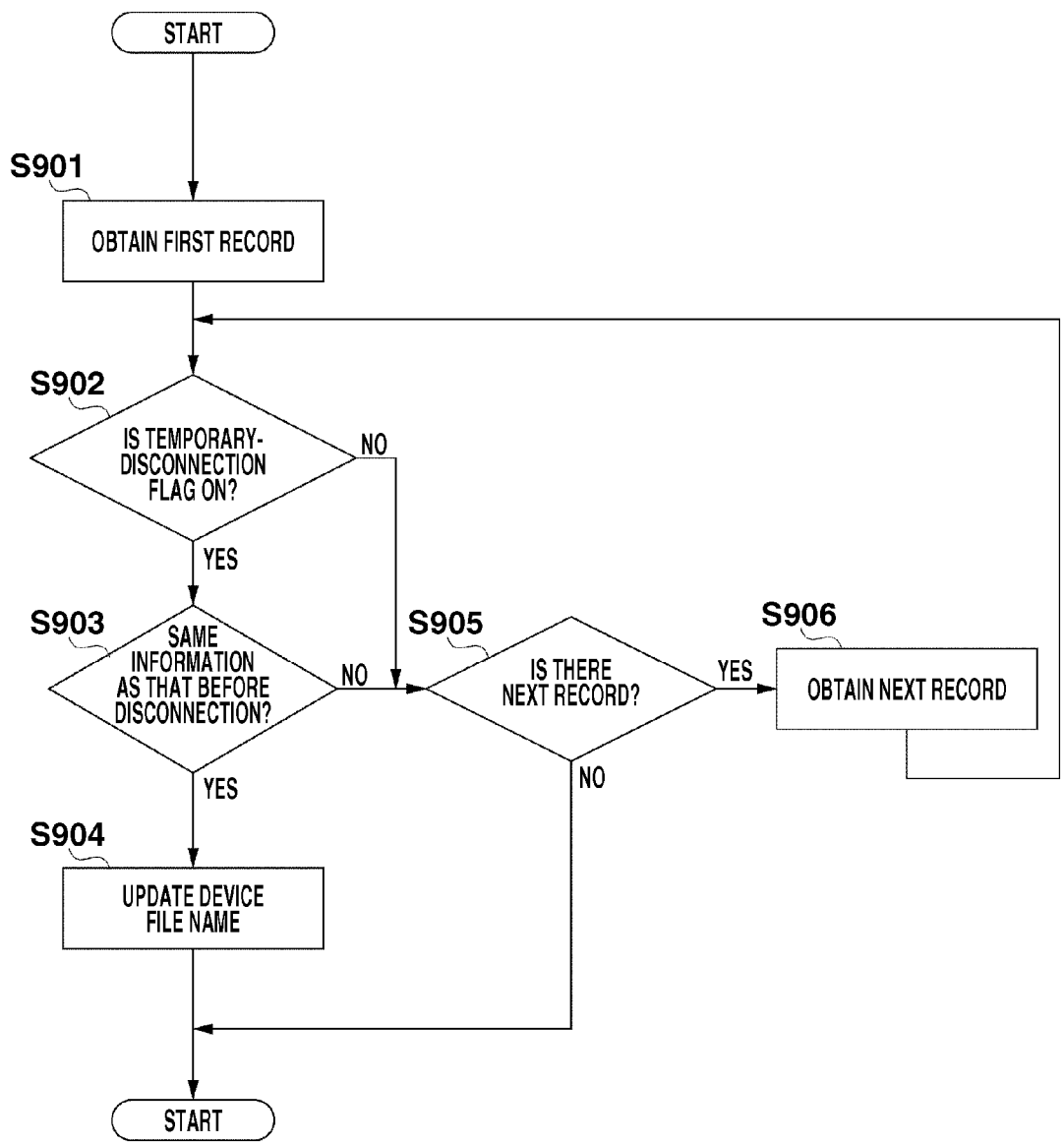
FIG. 9 is a flowchart illustrating processing for updating management information in a digital multifunction peripheral.

FIG. 9 is a flowchart illustrating processing for updating the management information in the control unit 201 performed by the CPU 102. The flowchart illustrates details of the processing in step S807 of the flowchart in FIG. 8.

In step S901, the state management unit 203 obtains a first record of the management information (i.e., the information 700B in FIG. 7). In step S902, the state management unit 203 determines whether the temporary-disconnection flag is ON. If the temporary-disconnection flag is ON (YES in step S902), the processing proceeds to step S903.

In step S903, it is determines whether the device file name of the record in the management information 700B matches the previous device file name in the management information 600B which is updated in step S503 in FIG. 5. If the device file names match with each other (YES in step S903), the processing proceeds to step S904.

In step S904, the device file name of the record in the management information 700B is changed to the device file name in the detected information. In other words, at the reconnection, the operating system 205 updates the device file name to a device file name newly assigned to the memory card slot. Then, the temporary-disconnection flag for the record is updated from ON to OFF. Accordingly, the management information 700B is updated to the management information 700C.

On the other hand, if the temporary-disconnection flag is not ON (NO in step S902) or the device file names do not match with each other (NO in step S903), the processing proceeds to step S905. In step S905, it is determined whether there is a next record in the management information. If there exists a next record in the management information (YES in step S905), then in step S906, the state management unit 203 obtains the next record, and the processing returns to step S902. If there is not a next record (NO in step S905), the processing ends.

As a result of the processing of the flowchart in FIG. 9, identification information (e.g., drive letter) in the management information is displayed on the operation unit 107 as access information. Even if static electricity is applied, the identification information (e.g., drive letter) of the memory card displayed on the operation unit 107 is not changed. Since the state management unit 203 updates the device file associated with the identification information that is specified by the operator to the device file that is changed after the reconnection, access to the reconnected memory card can be established. Consequently, even if the USB host I/F 108 is temporarily disconnected from the memory card reader writer 109 due to applying of static electricity for example, an operator can access the memory card by the same operation as that before the disconnection.

In the present exemplary embodiment, a case is described where the memory card reader writer 109 is disconnected while an operator is not accessing a memory card. However, even when the memory card reader writer 109 is disconnected while the user is accessing the memory card (e.g., reading or writing data from or to the memory), the processing for reconnection can be performed similarly. In this case, however, since an access operation being performed is interrupted, a notification of the failed operation may be made only when the disconnection happens during the access, and an instruction for re-reading and/or rewriting data from and to the memory may be output to the operation unit 107.

According to the above described exemplary embodiment, even when the memory card reader writer is temporarily disconnected due to applying of static electricity for example, access to the memory can be made without making an operator aware of the disconnection which is not intended by the operator.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-149802 filed Jun. 24, 2009, which is hereby incorporated by reference herein in its entirety.

What is claimed is:

1. An information processing apparatus comprising:
   an interface unit arranged to connect a reader/writer device, wherein the reader/writer device is capable of receiving a memory storage medium;
   a detection unit configured to detect a connection and a disconnection between the interface unit and the reader/writer device;
   a management unit configured to manage identification information for identifying the memory storage medium inserted into the reader/writer device; and
   an unmount unit configured to set the memory storage medium to an unmounted state, wherein, in response to the detection unit detecting that the reader/writer device, to which the memory storage medium having not been set to the unmounted state by the unmount unit has been inserted, is temporary disconnected from the interface unit, the management unit manages the identification information such that the memory storage medium inserted into the reader/writer device reconnected to the interface unit can be identified by the identification information assigned before the reader/writer device is temporary disconnected from the interface unit.

2. The information processing apparatus according to claim 1, wherein-, in response to the reader/writer device of which temporary disconnection is detected by the detection unit being a specific reader/writer device, the management unit manages the identification information such that the memory storage medium inserted into the reader/writer device reconnected to the interface unit can be identified by the identification information assigned before the reader/writer device is temporary disconnected from the interface unit.

3. The information processing apparatus according to claim 1, wherein the management unit manages information indicating whether the memory storage medium inserted into the reader/writer device is in a mounted state or the unmounted state.

4. The information processing apparatus according to claim 1, wherein the reader/writer device comprises one or more slots for receiving one or more memory storage medium.

5. The information processing apparatus according to claim 1, further comprising:
   a display unit configured to display information about the reader/writer device connected to the interface unit;
   a notification unit configured to notify the display unit of a detection result by the detection unit; and a control unit configured, in response to the detection unit detecting that the reader/writer device is temporary disconnected from the interface unit, to control the notification unit not to notify the display unit about the temporary disconnection of the reader/writer device from the interface unit.

6. The information processing apparatus according to claim 1, further comprising a display unit configured to display information about the memory storage medium inserted into the reader/writer device, wherein the display unit is arranged to display the identification information about the memory storage medium that is inserted into the reader/writer device, and the display unit also is arranged, in response to the detection unit detecting that the reader/writer device, to which the memory storage medium having not been set to the unmounted state by the unmount unit has been inserted, is temporary disconnected from the interface unit, to not change the display of the identification information about the memory storage medium.

7. A method for controlling an information processing apparatus which includes an interface unit configured to connect the information processing apparatus to a reader/writer device capable of receiving a memory storage medium, the method comprising:

detecting a connection of the interface unit to the reader/writer device;

assigning identification information for identifying the memory storage medium inserted into the reader/writer device;

detecting a temporary disconnection of the interface unit from the reader/writer device; and managing, in response to it being detected that the reader/writer device, to which the memory storage medium having not been set to the unmounted state has been inserted, is temporary disconnected from the interface unit, the identification information such that the memory storage medium inserted into the reader/writer device reconnected to the interface unit can be identified by the identification information assigned before the reader/writer device is temporary disconnected from the interface unit.

8. A non-transitory storage medium storing a program which, when loaded into a computer, causes the computer to become the information processing apparatus of claim 1.

9. A non-transitory storage medium storing a program that causes a computer to perform the method of claim 7.

* * * * *